United States Patent [19]

Dams et al.

[11] Patent Number: 5,292,796
[45] Date of Patent: Mar. 8, 1994

[54] UREA-ALDEHYDE CONDENSATES AND MELAMINE DERIVATIVES COMPRISING FLUOROCHEMICAL OLIGOMERS

[75] Inventors: Rudolf J. Dams; Johan E. De Witte, both of St. Paul, Minn.

[73] Assignee: Minnesota Mining and Manufacturing Company, St. Paul, Minn.

[21] Appl. No.: 679,652

[22] Filed: Apr. 2, 1991

[51] Int. Cl.$^5$ .................... C08L 61/32; C08G 12/40; B32B 27/06; B32B 27/08

[52] U.S. Cl. ........................... 524/598; 524/520; 525/199; 525/200; 525/474; 525/509; 525/518; 525/519; 427/389; 427/389.9; 427/391; 427/392; 427/393.5; 428/421; 428/473; 428/524; 428/526; 428/530; 428/532; 428/537.5

[58] Field of Search ............... 524/520, 598; 525/199, 525/200, 509, 518, 519, 474; 427/389, 389.9, 391, 392, 393.5; 428/421, 473, 524, 526, 530, 532, 537.5

[56] References Cited

U.S. PATENT DOCUMENTS

| | | | |
|---|---|---|---|
| 2,654,720 | 10/1953 | Cohen et al. | 524/598 |
| 2,711,998 | 6/1955 | Weaver et al. | 524/598 |
| 3,087,905 | 4/1963 | Fluck | 524/598 |
| 3,128,272 | 4/1964 | Wear et al. | 544/199 |
| 3,341,497 | 9/1967 | Sherman et al. | 525/518 |
| 3,449,466 | 6/1969 | Gerek et al. | 525/199 |
| 3,574,791 | 4/1971 | Sherman et al. | 525/276 |
| 3,758,447 | 9/1973 | Falk et al. | 428/262 |
| 3,787,351 | 1/1974 | Olson | 523/453 |
| 3,844,999 | 10/1974 | Petrella | 525/518 |
| 3,894,992 | 7/1975 | Raynolds | 524/598 |
| 3,914,225 | 10/1975 | Hiestand et al. | 525/518 |
| 4,302,366 | 11/1981 | Perronin et al. | 252/395 |
| 4,997,893 | 3/1991 | Süling et al. | 525/518 |
| 5,130,201 | 7/1992 | Yoshimura et al. | 525/199 |
| 5,173,547 | 12/1992 | Röttger et al. | 525/518 |

FOREIGN PATENT DOCUMENTS

| | | |
|---|---|---|
| 55-7820 | 1/1980 | Japan . |
| 63-27366 | 7/1980 | Japan . |

OTHER PUBLICATIONS

Sax et al., *Hawley's Condensed Chemical Dictionary*, Eleventh Edition, Van Nortrand Reinhold, New York, 1987, p. 61.
H. C. Fielding, "Organofluorine Compounds and Their Applications", R. E. Banks, Ed. Society of Chemical Industry, p. 214 (1979).
Makromol Chem., 1986, 187, p. 1627 (Akemi et al.).
*J. Polymer Science*, Part A., 1988, 26, p. 2991 (Chujo et al.).
*Polymer Bulletin*, 1982, 8, p. 239 (Chujo et al.).
Kirk-Othmer Encyclopedia of Chemical Technology, 3rd Ed., vol. 2, pp. 440–469, Wiley-Interscience, 1978.

*Primary Examiner*—John Kight, III
*Assistant Examiner*—Rabon Sergent
*Attorney, Agent, or Firm*—Gary L. Griswold; Walter N. Kirn; Robert H. Brink

[57] ABSTRACT

Fluorochemical compositions comprising fluorinated compounds, wherein the fluorinated compound comprises fluorochemical oligomeric portion bonded through —O—, —S—, —NH—, or $CO_2$— to a moiety comprising a group derived from an amino resin. Also disclosed are fluorochemical compositions in the form of fluorochemical liquid dispersions and methods for preparing substrates treated with such compositions. Substrates so treated exhibit particularly durable and abrasion-resistant oil and water repellent properties.

31 Claims, No Drawings

UREA-ALDEHYDE CONDENSATES AND MELAMINE DERIVATIVES COMPRISING FLUOROCHEMICAL OLIGOMERS

This invention relates to fluorochemical compositions for use in providing repellent properties to a substrate material. In another aspect, this invention relates to fluorochemical compounds that contain fluoroaliphatic groups proximal to one another. In yet another aspect, it relates to fluorochemical compounds that are at least in part oligomeric in nature. In still another aspect, this invention relates to fluorochemical compounds that contain urea/aldehyde condensates or melamine derivatives. This invention also relates to fluorochemical compounds that impart a property such as water repellency when applied to substrate materials, and in another aspect to substrates that are treated with fluorochemical compounds.

Organofluorine compounds (i.e., fluorochemicals) are substances containing portions that are fluorocarbon in nature (e.g., hydrophobic, oleophobic, and chemically inert) and portions that are organic or hydrocarbon in nature (e.g., chemically reactive in organic reactions). Some fluorochemicals are familiar to the general public, such as SCOTCHGARD ™ carpet protector, which imparts oil and water repellency and stain and soil resistance to carpet. Other such substances have various industrial uses, such as reducing the surface tension of liquids, reducing evaporation and inflammability of volatile organic liquids, and improving the leveling of organic polymer coatings.

The utility of organofluorine compounds as surface-active agents (i.e., surfactants) and surface-treating agents is due in large part to the extremely low free-surface energy of a $C_6$-$C_{12}$ fluorocarbon group, according to H. C. Fielding, "Organofluorine Compounds and Their Applications," R. E. Banks, Ed., Society of Chemical industry at p. 214 (1979). Generally, the organofluorine substances described above are those which have carbon-bonded fluorine in the form of a monovalent fluoroaliphatic radical such as a perfluoroalkyl group, typically $C_nF_{2n+1}$, where n is at least 3, the terminal part of which group is trifluoromethyl, —$CF_3$.

Pertinent to the present invention are fluorochemical compositions involving oligomeric fluorochemicals (sometimes referred to as macromeric fluorochemicals). U.S. Pat. No. 3,574,791 (Sherman et al.) describes hydroxy-terminated prepolymers containing fluorinated segments and hydrophilic segments. Such prepolymers are made by free radical polymerization of a fluorine-containing acrylate with a non-fluorinated acrylate in the presence of an initiator and a functional mercaptan (e.g., 2-mercaptoethanol). Also described is the conversion of an above-described prepolymer to a methacrylate by esterification of the prepolymer with methacrylic anhydride, and the co-polymerization of the resulting methacrylate with a monomer containing a hydrophilic group.

U.S. Pat. No. 3,758,447 (Falk et al.) describes polymers that result from free radical polymerization of a monomer in the presence of perfluoroalkyl mercaptans, which act as chain-transfer agents. Mercaptans that contain pairs or triplets of closely-packed perfluoroalkyl groups are said to produce polymers with higher oil repellency levels compared with analogous polymers derived from a mercaptan with just one perfluoroalkyl group or perfluoroalkyl groups that are not closely packed.

U.S. Pat. No. 4,302,366 (Perronin et al.) describes fluorinated products resulting from the reaction of (a) one molecule of one or more acids of the formula:

$$HS—A(COOH)_n \qquad (i)$$

and of (b) one to five molecules of one or more compounds possessing at least one ethylenic bond, at least one of these compounds corresponding to the general formula:

$$R_f—B—\underset{\underset{R}{|}}{C}=CH—R \qquad (ii)$$

and possibly neutralized or partially neutralized with an inorganic or organic base. In the formulae (i) and (ii), "A" represents an aliphatic or aromatic hydrocarbon radical, "n" is a whole number from 1 to 4, "$R_f$" represents a straight or branched perfluorinated chain containing 1 to 20 carbon atoms, "B" represents bivalent, possibly branched, chaining and may comprise sulfur, oxygen or nitrogen atoms, one of the symbols "R" represents a hydrogen atom and the other a hydrogen atom or an alkyl group containing 1 to 4 carbon atoms. These fluorinated products applied to substrate materials are said to confer an oilproofing and waterproofing effect as well as a resistance to aggressive products or solvents.

Japanese Patent No. 63-27366 describes a method of manufacture of a fluorine-containing block oligomer characterized by the following general formula:

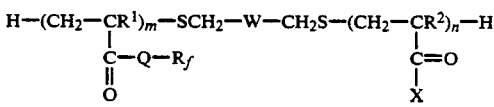

$$H—(CH_2—CR^1)_m—SCH_2—W—CH_2S—(CH_2—CR^2)_n—H$$
with substituents $C—Q—R_f$ (with $\|O$) and $C=O$ (with $X$)

wherein:

$R_f$ represents a polyfluoroalkyl group with 3-20 carbon atoms, $R^1$ and $R^2$ represent hydrogen atoms or methyl groups, m and n represent integers from 1-40, Q represents —O—A, —O—A—N(R)$O_2$S, or —O—A—N(R)OC—, A represents a bifunctional alkylene group with 1-10 carbon atoms, R represents hydrogen atom or alkyl group, X represents —$OR^3$, —$NHR^3$, —$NR^3R^4$, —$R^3(R^4)(R^5)$, or —$OCH_2CH_2NR^3(R^4)(O)$, $R^3$, $R^4$, or $R^5$ represent hydrogen atoms, alkyl groups, allyl group, aralkyl groups, or hydroxyalkyl groups, Y and Z represent —$CO_2CH$, or —$CH_2NH_2$, and W represents —$CO_2CH_2$—, $CH_2OCH_2$—, or —$CONHCH_2$—.

Japanese Unexamined Application (Kokai) 55-7820 describes a method of modifying a polymer by adding a small amount of the fluoro compound described below:

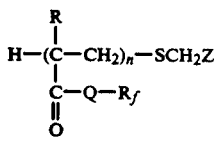

wherein $R_f$ is polyfluoroalkyl with 3–20 carbon atoms,

R is a hydrogen atom or methyl group,

Z is $CO_2H$, —$CH_2OH$, or —$CH_2NH_2$,

Q is a bivalent organic radical, and n is an integer between 1–40 or a derivative of the fluoro compound in which a functional radical is bonded through an active radical in Z to a synthetic polymer. Also described is a method for improving the surface of a synthetic polymer by addition of small quantities of the above-described compound, lowering the surface friction.

*Macromol. Chem.* 1986, 187, 1627 (Akemi et al.) describes block copolymers prepared from the reaction of, e.g., (i) oligomeric α-hydro-ω-(2-hydroxyethylthio)poly-[1-(3,3,4,4,5,5,6,6,6-nonafluorohexyloxycarbonyl)ethylene], and (ii) oligomeric α,ω-Bis(4-cyanatophenylthio)poly(1-phenylethylene). This block copolymer is said to have good antithrombogenicity due to the surface free energy gap between microdomains.

*J. Polymer Science*, Part A 1988, 26, 2991 (Chujo et al.) describes a di-carboxyl terminated macromonomer prepared by the free radical co-polymerization of a perfluoroalkylethyl acrylate and methyl methacrylate in the presence of thiomalic acid. Also described is the reaction of such macromonomers with organic dicarboxylic acids and organic diamines in the presence of an appropriate catalyst to afford a copolymer wherein the macromonomer is grafted onto a polyamide chain.

In addition to the fluorochemicals described above, some non-fluorinated macromonomers and some reactions thereof have been reported. For example, *Polymer Bulletin* 1982, 8, 239 (Chujo et al.) describes a dihydroxyl terminated macromonomer prepared by free radical polymerization of methyl methacrylate in the presence of α-thioglycerol. Also described is the reaction of this macromonomer with 1,4-butanediol and an organic diisocyanate to afford a copolymer wherein the macromonomer is grafted onto a polyurethane chain. No utility is described for these compounds.

U.S. Pat. No. 3,787,351 (Olsen) discloses the reaction of a hydroxy-terminated fluorochemical oligomer with 2,4-toluene diisocyanate. The product of said reaction is then reacted with poly(oxyalkylene)polyol to afford a fluoroaliphatic block copolymer with urethane linkages. The compounds of said patent are said to improve the mechanical properties of shaped articles.

This invention provides a fluorochemical composition comprising one or more fluorinated compounds, each of the latter comprising:

a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group, wherein the oligomeric portion is bonded through a linking group selected from the group consisting of —O—, —S—, —NH—, and —$CO_2$—, to a moiety comprising a group derived from an amino resin.

Formulas used herein to represent the structures of the compounds of the invention indicate the presence of chains of polymerized units derived from fluorochemical and non-fluorinated monomers; those formulas are not intended to indicate ordering of units (e.g., "blocks" of units such as in a block copolymer, or alternating units) in the chain. The terms "oligomer" or "oligomeric" when used herein designate compounds containing a plurality of polymerized units, but fewer than that number of polymerized units present in a polymer (e.g., chains of 2 to about 40 polymerized units are to be considered "oligomeric").

In a preferred embodiment, a fluorinated compound contained in a fluorochemical composition of the invention comprises a group that can impart soft hand, stain release, or water repellency, when the compound is applied to a fibrous substrate, e.g., a natural fabric such as cotton or wool, or a synthetic fabric such as polyester or nylon, or blends of any two or more of the foregoing, or paper, leather, and the like. Preferred among such groups are polyoxyalkylenyl and siloxanyl groups.

This invention also provides fluorochemical compositions in the form of aqueous liquid dispersions comprising water, a fluorochemical compound of the invention in an amount effective to impart repellent properties to a substrate treated with the dispersion, and an emulsifier in an amount effective to stabilize the dispersion.

Further, this invention provides substrates that exhibit particularly durable and abrasion-resistant oil and water repellent properties imparted to the substrates by treatment with said aqueous liquid dispersions, and methods for preparing such substrates.

The fluorinated compounds in a composition of the invention generally contain a plurality of fluoroaliphatic groups proximal to one another (e.g., on alternating carbon atoms of an aliphatic backbone, or occasionally on adjacent carbon atoms), as distinct from isolated fluoroaliphatic groups distributed throughout the compound and also as distinct from fluoroaliphatic groups uniformly on adjacent carbon atoms. Substrates treated with preferred compositions of the invention exhibit considerably higher oil repellency than substrates treated with compositions containing only isolated fluoroaliphatic groups, and exhibit particularly high durability after laundering or dry cleaning.

In other preferred embodiments, the invention provides fluorochemical compositions comprising fluorinated compounds of Formulas I or II

(A—Z)$_n$R       (I)

A(Z—R)$_n$       II wherein A is a fluorochemical oligomeric portion of the formula

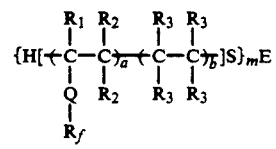

and wherein n is a whole number (e.g., from 1 to about 10);

m is an integer from 1 to about 5;

a and b are integers such that A is oligomeric and comprises a plurality of $R_f$ groups;

$R_1$ is hydrogen, halogen, or straight chain or branched chain alkyl containing 1 to about 4 carbon atoms;

each $R_2$ is independently hydrogen or straight chain or branched chain alkyl containing 1 to about 4 carbon atoms;

Q is an organic linking group, such as a sulfonamido group;

$R_f$ is a fluoroaliphatic group, such as —$(CF_2)_7CF_3$, that comprises a fully fluorinated terminal group;

each $R_3$ is independently hydrogen, halogen, or an organic group, such as a carboxyl group or an alkyl carboxylate group;

E is an organic group, such as —$CH_2CH_2$—;

each Z is independently a linking group selected from the group consisting of —O—, —S—, —$CO_2$—, and —NH—;

R comprises a group derived from an amino resin; and wherein, in the instance of Formula I, one of the $R_1$, $R_2$, $R_3$, Q, and E groups has an unsatisfied valence or a bond (not shown in the oligomeric formula above) through which the group is bonded to Z, and in the instance of Formula II, at least one of the $R_1$, $R_2$, $R_3$, Q, and E groups has at least one unsatisfied valence or bond (not shown), through which each such group is bonded to a separate group Z, the total number of unsatisfied valences or bonds being equal to the value of the integer n. Optionally, at least one of $R_1$, $R_2$, $R_3$, Q, E, and R, comprises a group, such as siloxanyl or polyoxyalkylenyl, that can impart soft hand, stain release, or water repellency when the compound is applied to a fibrous substrate.

In other preferred embodiments, this invention provides fluorochemical compositions comprising compounds of Formula III $$(B—Z)_n R \qquad \text{III}$$

wherein B is a fluorochemical oligomeric portion of the formula

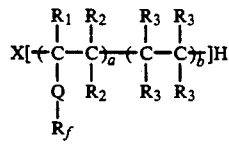

wherein n, a, b, $R_1$, $R_2$, Q, $R_f$, $R_3$, Z, and R are as defined above for Formula I, X is a group derived from a free radical initiator (e.g., t-butoxy); and wherein one of the $R_1$, $R_2$, $R_3$, Q, and X groups has an unsatisfied valence or bond through which the group is bonded to Z. In a compound of Formula III optionally at least one of $R_1$, $R_2$, $R_3$, Q, and X comprises a group that can impart soft hand, stain release, or improved water repellency when the compound is applied to a fibrous substrate.

As described above and further illustrated in Formulas I-III, a fluorochemical composition of the invention comprises a fluorinated compound that generally has three principal portions: a fluorochemical oligomeric portion, a linking group, and a moiety comprising a group derived from an amino resin. The fluorochemical oligomeric portion and the moiety comprising a group derived from a melamine derivative or urea-aldehyde condensate are linked together by the linking group. Preferred embodiments further comprise a group that can impart soft hand, stain release, or water repellency when the compound is applied to a fibrous substrate.

A salient component of the fluorochemical oligomeric portion is the fluoroaliphatic group, designated herein as $R_f$. $R_f$ is a stable, inert, nonpolar, preferably saturated moiety that is both oleophobic and hydrophobic. A fluorinated compound contains a plurality of $R_f$ groups (e.g., from 2 to about 50) proximal to one another and preferably contains from about 5 percent to about 80 percent, more preferably from about 20 percent to about 65 percent, and most preferably about 25 percent to about 55 percent fluorine by weight based on the total weight of the compound, the loci of the fluorine being essentially in the $R_f$ groups. $R_f$ preferably contains at least about 3 carbon atoms, more preferably 3 to about 20 carbon atoms, and most preferably about 6 to about 14 carbon atoms. $R_f$ can contain straight chain, branched chain, or cyclic fluorinated alkylene groups or combinations thereof or combinations thereof with straight chain, branched chain, or cyclic alkylene groups. $R_f$ is preferably free of polymerizable olefinic unsaturation and can optionally contain catenary heteroatoms such as oxygen, divalent or hexavalent sulfur, or nitrogen. It is preferred that $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., ($CF_3CF_2CF_2$—, ($CF_3)_2CF$—, —$CF_2SF_5$, or the like. Perfluorinated aliphatic groups (i.e., those of the formula $C_nF_{2n+1}$) are the most preferred embodiments of $R_f$.

The aliphatic backbone of the fluorochemical oligomeric portion comprises a sufficient number of polymerized units to render the portion oligomeric. The aliphatic backbone preferably comprises from 2 to about 20 polymerized units derived from fluorinated monomers (i.e., monomers containing a fluorinated organic group $R_f$ as defined above), and from 0 to about 20 polymerized units derived from non-fluorinated monomers. In instances where only units derived from fluorochemical monomers are present, it is more preferred that the aliphatic backbone comprise from 2 to about 8, most preferably about 4, polymerized units. In instances where both fluorochemical and non-fluorinated monomers are used, likewise the aliphatic backbone preferably comprises from 2 to about 8, most preferably about 4 units. The ratio of moles of polymerized units derived from fluorochemical monomer to moles of polymerized units derived from non-fluorinated monomer will not be the same in each compound present in a particular composition of the invention. Therefore, such compositions and compounds of the invention can be characterized with respect to the overall ratio of polymerized units derived from fluorochemical monomer to polymerized units derived from non-fluorinated monomer, which is determined primarily by the relative amounts thereof used in the preparation of a composition of the invention. It is preferred that the overall ratio of moles of polymerized units derived from fluorochemical monomer to moles of polymerized units derived from non-fluorinated monomer be from 20:1 to about 1:4, preferably from about 10:1 to about 2:3, and most preferably about 4:1.

The fluorochemical oligomeric portion is linked to the moiety comprising a group derived from an amino resin by a linking group designated as Z in the formulas used herein. Z results from the displacement of a hydroxy or alkoxy group from the amino resin by a compound containing a nucleophilic functional group such as hydroxy, amino, mercapto, or carboxy. In a composition of the invention, Z is —O—, —S—, —NH—, or —CO$_2$—.

The moiety comprising a group derived from an amino resin can be any group resulting from the reaction of a nucleophile (such as a hydroxyl, amino, carboxyl, or thiol group) with an amino resin. The term "amino resin" designates any of the broad class of materials based on the reaction of formaldehyde with urea, melamine, benzoguanamine, or acetylguanamine. Such compounds are well known and discussed in, for example, "Kirk-Othmer Encyclopedia of Chemical Technology", 3rd Ed. Volume 2, pages 440–469, Wiley-Interscience, 1978. Included are methylolated melamines, benzoguanamines, and acetylguanamines; methylolated ureas such as dimethylolurea, dimethylolethyleneurea, tetramethylolacetylene urea, and dimethylolpropyleneurea; dimethylol derivatives of tetrahydro-5-alkyl—S—triazone; glyoxal resins such as dimethyloldihydroxyethyleneurea (DMDHEU) and tetramethylolglycoluril; methylated derivatives of any of the foregoing; and uron resins such as N,N'-bis(methoxymethyl)uron. Methylolacrylamide and methylolmethacrylamide are also intended to be included within the broad class of amino resins. Accordingly, suitable structures for the moiety R include those shown in Table A below, wherein each A' is independently hydrogen, hydroxymethyl, or methoxymethyl, B' is hydrogen, hydroxyl, or alkyl, D' is alkyl, hydroxyalkyl, or alkoxyalkyl, and n is an integer from 1 to about 4. Also suitable for moiety R are structures from TABLE A wherein any or all of the hydroxymethyl or methoxymethyl groups are replaced by methylene groups.

TABLE A

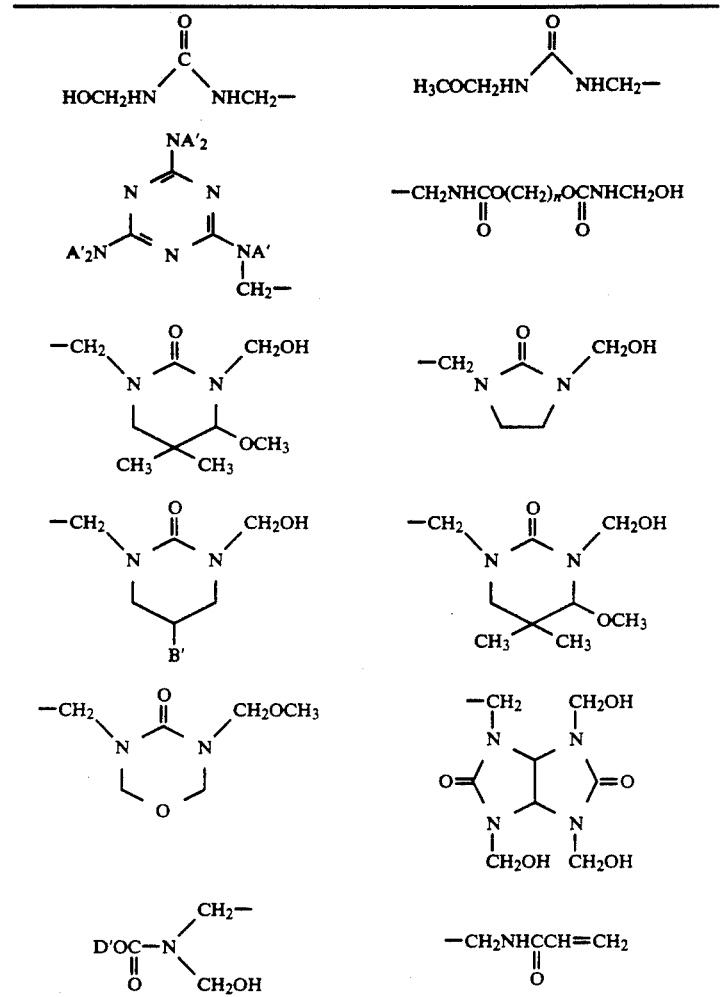

A fluorinated compound of the invention preferably contains a group that can impart soft hand, stain release, or water repellency when the compound is applied to a fibrous substrate. It is preferred that such a group be comprised by the moiety R. Such a group, however, can alternatively be comprised by the fluorochemical oligomeric portion. In particular, with reference to Formulas I–III, any one or more of the substituents Q, R$_1$, R$_2$, R$_3$, R, and E or X can comprise such a group.

Any property that can be imparted through the use of fluorochemicals on fibrous substrates can be imparted by the compositions of the invention. It is sometimes preferred to incorporate into a fluorinated compound of this invention a group that imparts a soft hand (i.e., a group that improves the softness or "hand") to a substrate treated with a fluorochemical composition of this invention. Such groups are well known to those skilled in the art and include siloxanyl groups such as polymethylphenylsiloxanyl, polydimethylsiloxanyl, and the like. Also, groups that enhance other aspects of performance can be incorporated. For example, long chain alkyl groups can be incorporated in order to improve water repellency, and it is well known to those skilled in the art that polyoxyalkylenyl groups, such as polyoxyethylenyl groups, can be incorporated into fluorochemicals to improve stain release (see generally "Organofluorine Compounds and Their Industrial Applications" by R. E. Banks, p. 229 (Ellis Horwood Limited, 1979). As with the above discussed durability-enhancing groups, these groups are preferably comprised by the moiety R, but can be comprised by the fluorochemical oligomeric portion as well.

The fluorinated compounds and fluorochemical compositions of the invention will be illustrated with reference to the embodiments shown in Formulas I–III. In such embodiments, linking group Q links the fluoroaliphatic group $R_f$ to the aliphatic backbone of the fluorochemical oligomeric portion. Linking group Q preferably contains from 1 to about 20 carbon atoms. Q can optionally contain oxygen, nitrogen, sulfur, or silicon-containing groups or a combination thereof, and Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of structure suitable for linking group Q include straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene. Preferred linking groups Q can be selected according to ease of preparation and commercial availability.

Below is a partial representative list of suitable Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and $R_2'$ is alkyl of 1 to about 20 carbon atoms.

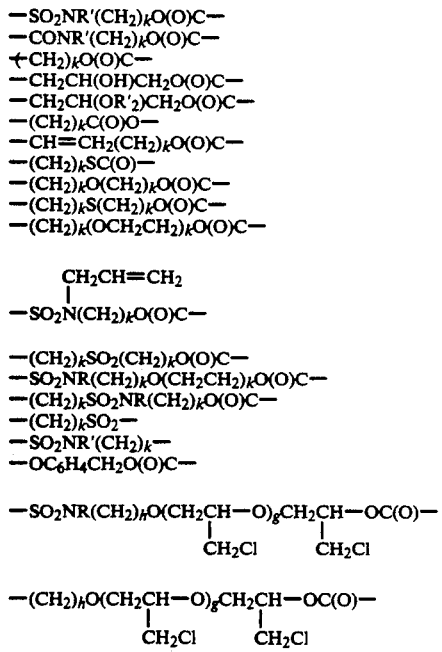

Q is preferably alkylene or sulfonamido, or sulfonamidoalkylene.

Returning now to Formulas I–III above, $R_1$ is hydrogen, halogen (e.g., fluoro, chloro, bromo), or straight chain or branched chain alkyl of 1 to about 4 carbon atoms (e.g., methyl, ethyl, propyl, isopropyl, butyl, isobutyl, and the like).

Each $R_2$ is independently hydrogen or straight chain or branched alkyl of 1 to about 4 carbon atoms.

Each $R_3$ is independently hydrogen, halogen, or an organic group that, as discussed above in connection with linking group Q, preferably does not substantially interfere with free-radical oligomerization. Examples of structure suitable for $R_3$ include hydrogen, chloro, alkyl, cycloalkyl, aryl, aralkyl, imino, oxy, oxo, hydroxy, alkylthio, alkoxy, cyano, formyl, acyloxy, amido, sulfonamido, combinations thereof, and the like.

X is a group derived from a free-radical initiator. As used herein, the term "free-radical initiator" designates any of the conventional compounds such as organic azo compounds, organic peroxides (e.g., diacyl peroxides, peroxyesters, dialkyl peroxides) and the like that provide initiating radicals upon homolysis. As used herein, the term "group derived from a free-radical initiator" designates an initiating radical formed upon homolytic decomposition of a free-radical initiator.

Suitable groups X include non-reactive groups such as t-butoxy (derived from di-t-butylperoxide), and benzoyloxy (derived from benzoyl peroxide), and reactive groups such as —C(CH₃)(CN)CH₂CH₂CO₂H (derived from azo-4-cyanoisovaleric acid), —C(CH₃)₂CN (derived from azoisobutyronitrile), and those derived from other known functional azo compounds such as 2,2'-azobis[N-(4-chlorophenyl)-2-methylpropionamidine]-dihydrochloride; 2,2'-azobis[N-(4-hydroxyphenyl)-2-methylpropionamidine]dihydrochloride; 2,2'-azobis[N-(4-aminophenyl)-2-methylpropionamidine]tetrahydrochloride; 2,2'-azobis[2-methyl-N-2-propenylpropionamidine]dihydrochloride; 2,2'-azobis[N-(2-hydroxyethyl)-2-methylpropionamidine]dihydrochloride; 2,2'-azobis[2-methyl-N-(2-hydroxyethyl)propionamide]; 2,2'-azobis[2-(hydroxymethyl)propionitrile]; 2,2'-azobis{2-methyl-N-[1,1-bis(hydroxymethyl)-2-hydroxyethyl]propionamide}; and 2,2'-azobis{2-methyl-N-[1,1-bis(hydroxymethyl)ethyl]propionamide}. Preferred groups X include those enumerated above.

Linking group E preferably contains from 1 to about 20 carbon atoms. E can optionally contain oxygen-, nitrogen-, sulfur-, or silicon-containing groups or a combination thereof, and E is preferably free of functional groups that substantially interfere with free-radical oligomerization. Examples of structure suitable for E include straight chain, branched chain or cyclic alkylene, arylene, aralkylene, oxy, oxo, hydroxy, thio, sulfonyl, sulfoxy, imino, sulfonamido, acylimino, acyloxy, urethanylene, ureylene, and combinations thereof. E is preferably alkylene.

As illustrated in Formulas I–III, a compound can contain a plurality of Z groups each bonded to the fluorochemical oligomeric portion through any of $R_1$, $R_2$, $R_3$, Q, X and/or E. In most embodiments, it is preferred that there be 1 group Z in a compound, preferably being bonded to the fluorochemical oligomer portion through group E in a compound of Formulas I or II, or through group X in a compound of Formula III. These embodiments are discussed in detail below in connection with Schemes I and II below.

Compositions of the invention can be prepared as shown in Schemes I and II below, wherein n, a, b, q, $R_1$, $R_2$, Q, $R_3$, $R_f$, X, E, and R are as defined above, and $R_5$, $R_6$ G, $R_7$, Y and L generally correspond to $R_1$, $R_2$, Q, $R_5$, X, and E, respectively, absent the proviso that at least one thereof has an unsatisfied valence and with the proviso that at least one thereof possesses a functional group capable of reacting with an amino resin or capable of being converted or further elaborated into such a functional group. Products other than those shown in the schemes will be produced by the various steps. The schemes show only the major products of the various steps.

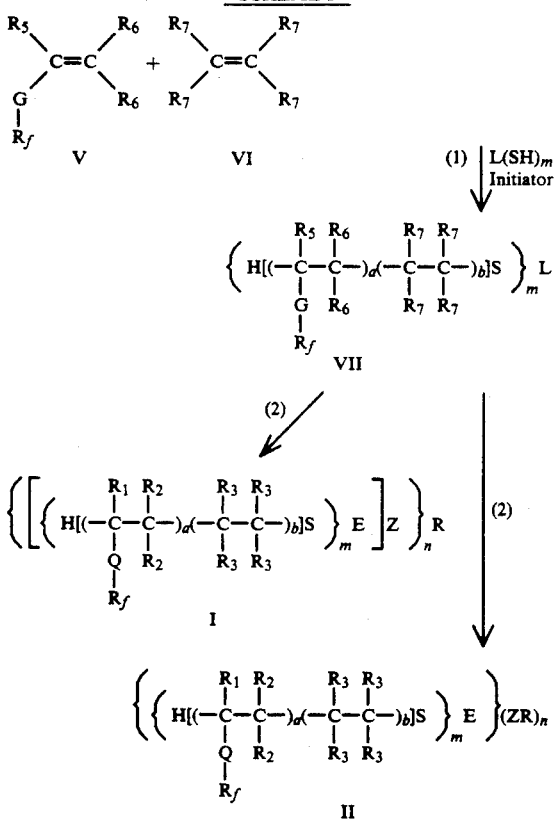

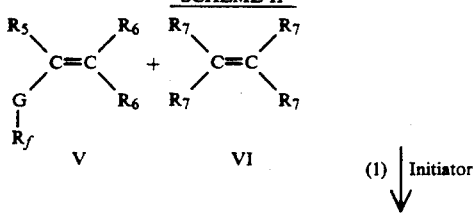

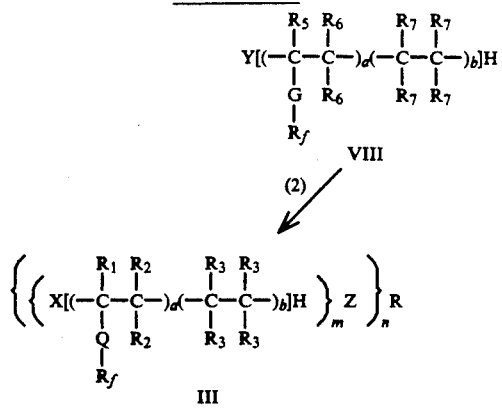

In step (1) of Scheme I, a fluorochemical monomer of Formula V is oligomerized in the presence of a free-radical initiator, an end-capping agent of the formula $L(SH)_m$, and optionally a non-fluorinated comonomer of Formula VI. In Scheme II, the monomers are the same, the end-capping agent is optionally present, and the initiator is preferably a functional initiator.

Compounds of Formula V and methods for the preparation thereof are known and disclosed, e.g., in U.S. Pat. Nos. 2,803,615 (Ahlbrecht et al.) and 2,841,573 (Ahlbrecht et al.) which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds of Formula V include such as N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethyl methacrylate and N-methylperfluorooctanesulfonamidoethyl alcohol, perfluorooctyl acrylate, N-methyl perfluorooctanesulfonamidoethyl vinyl ether, and $C_8F_{17}SO_2NHCH_2CH=CH_2$, and others such as perfluorocyclohexyl acrylate, and tetrameric hexafluoropropyleneoxide dihydroacrylate.

Compounds of Formula VI are also well known and generally commercially available. Examples of such compounds include general classes of ethylenic compounds capable of free-radical polymerization, such as lower olefinic hydrocarbons, optionally halogenated, such as ethylene, propylene, isobutene, 3-chloro-2-isobutene, butadiene, isoprene, chloro and dichlorobutadienes, fluoro and difluorobutadienes, 2,5-dimethyl-1,5-hexadiene; vinyl, allyl or vinylidene halides such as vinyl or vinylidene chloride, vinyl or vinylidene fluoride, allyl bromide, allyl chloride, methallyl chloride; styrene and its derivatives such as vinyltoluene, α-methylstyrene, α-cyanomethylstyrene, divinylbenene, N-vinylcarbazole; vinyl esters such as vinyl acetate, vinyl propionate, vinyl isobutyrate, vinyl succinate, vinyl stearate, divinylcarbonate; allyl esters such as allyl acetate and allyl heptanoate; alkylvinyl or alkylallyl ethers such as cetyl vinyl ether, dodecyl vinyl ether, isobutyl vinyl ether, ethyl vinyl ether, 2-chloroethyl vinyl ether, tetrallyloxyethane; vinyl alkyl ketones such as vinyl methyl ketone; unsaturated acids such as acrylic, α-chloro acrylic, α-fluoro acrylic, crotonic, maleic, fumaric, itaconic, and citraconic acids, and anhydrides and esters thereof such as dimethyl maleate, ethyl crotonate, acid methyl maleate, acid butyl itaconate, and vinyl, allyl, methyl, ethyl, butyl, isobutyl, hexyl, 2-ethylhexyl, chlorohexyl, octyl, lauryl, or stearyl acrylates and methacrylates; olefinic silanes such as vinyltrichlorosilane, vinyltrimethoxysilane, vinyltriethoxysilane, and methacryloyloxypropyl trimethoxysilane; nitriles such as acrylonitrile, methacrylonitrile, 2-chloroacrylonitrile, 2-cyanoethylacrylate, methylene glutaronitrile, vinylidene cyanide, alkyl cyanoacrylates such as isopropyl cyanoacrylate; (tris)-acryloyl-hexahydro-s-triazine; special acrylates such as butanediol dimethacrylate, dicyclopentenyl acrylate, ethoxylated bisphenol A dimethacrylate, isobornyl acrylate and methacrylate, trimethylolpropane triacrylate, allyl methacrylate; acrylamides and methacrylamides; mono or di (meth)acrylates of glycols or polyalkylene glycols such as ethylene glycol dimethacrylate, triethylene glycol acrylate, mono, di, and polyacrylates and methacrylates of methoxypolyethylene glycols and polyethylene glycols of various molecular weights (available as CARBOWAX TM), block copolymers of ethylene oxide and propylene oxide endcapped by hydroxy groups (available as PLURONIC TM), tetramethyleneoxide glycols (available as TERATHANE TM), amino or diamino-terminated polyethers (available as JEFFAMINE TM); mono, di, and polyacrylates and methacrylates of siloxane mono-, di-, or polyols such as 1,3-bis(4-hydroxybutyl)tetramethyl disiloxane (Petrarch Systems, Bristol, Penna.); VP-1610 siloxane diol (Wacker -Germany); Q4-3667 siloxane diol (Dow Corning); Q4-3557 siloxane diol (Dow Corning); acrylamides and methacrylamides of siloxane mono, di, or polyamines such as 1,3-bis(y-aminopropyl)tetramethyl disiloxane (Petrarch Systems); DC-531 siloxane polyamine (Dow Corning); DC-536 siloxane polyamine (Dow Corning); and others described in U.S. Pat. No. 4,728,571 (Clemens et al.), the disclosure of which is incorporated herein by reference.

Compounds of Formula V and Formula VI that possess particular functional groups in G, $R_5$, $R_6$, or $R_7$ can also be used in step (1) to ultimately provide, for example, compounds of Formulas I-III wherein the fluorochemical oligomeric portion of a compound is bonded to linking group Z through Q, $R_1$, $R_2$, or $R_3$. They can also be used to ultimately provide compounds of Formulas I-III that comprise a functional group that can impart soft hand, stainless, or improved water repellency when the compound is applied to a fibrous substrate (or a functional group capable of further elaboration as desired into such a functional group) bonded to the compound through Q, $R_1$, $R_2$, or $R_3$. Examples of such functionalized compounds of Formula VI include N-methylol acrylamide; N-methylol methacrylamide; aziridinyl acrylate and methacrylate; diacetone acrylamide and methacrylamide; methylolated diacetone acrylamide and methacrylamide; 2-hydroxy-3-chloropropyl acrylate and methacrylate; hydroxy ($C_2$ to $C_4$) alkyl acrylates and methacrylates; maleic anhydride; butadiene; isoprene; chloroprene; allyl alcohol; allyl glycolate; isobutenediol; allyloxyethanol; o-allyl phenol; divinyl carbinol; glycerol α-allylether, acrylamide; methacrylamide; maleamide; maleimide; N-cyanoethyl acrylamide; N-isopropyl acrylamide; glyoxal bis-acrylamide; metal salts of acrylic acid and methacrylic acid; vinylsulfonic and styrene p-sulfonic acids and their metal salts; 3-aminocrotonitrile; monoallylamine; vinylpyridines; n-vinylpyrrolidone; 2-acrylamido-2-methylpropanesulfonic acid (AMPS) and its salts; vinyl azlactones; glycidylacrylate and methacrylate; allyl glycidyl ether; acrolein; N,N-dimethylaminoethyl acrylate and methacrylate; N-tert-butylaminoethyl methacrylate; allyl methacrylate; diallyl maleate; vinyltriethoxysilane; vinyltrichlorosilane; and the like.

Whether or not a compound of the invention contains functional groups by virtue of the use of functionalized compounds of Formula V or Formula VI in its preparation, it can be provided (additional) functional groups by way of Scheme I through the use of an appropriate functionalized end-capping agent $L(SH)_m$ as defined above. Suitable functional groups for inclusion in the end-capping agent include hydroxy, amino, halo, epoxy, haloformyl, aziridinyl, acid groups and salts thereof such as those discussed above, quaternary ammonium groups and salts thereof also discussed above, and others that can render a composition durable when applied to a fibrous substrate, react with an amino resin, or are capable of further transformation into such groups. Examples of such compounds include 2-mercaptoethanol, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptoethyl ether, 2-mercaptoethylsulfide, 2-mercaptoimidazole, 8-mercaptomenthone, 2-mercaptonicotinic acid, 4-hydroxythiophenol, 3-mercapto-1,2-propanediol, 1-mercapto-2-propanol, 2-mercaptopropionic acid, N-(2-mercaptopropionyl)glycine, 3-mercaptopropyltrimethoxysilane, 2-mercaptopyridine, 2-mercaptopyridine-N-oxide, 2-mercaptopyridinol, 2-mercaptopyrimidine, mercaptosuccinic acid, 2,3-dimercaptopropanesulfonic acid, 2,3-dimercaptopropanol, 2,3-dimercaptosuccinic acid, 2,5-dimercapto-1,3,4-thiadiazole, 3,4-toluenedithiol, o-, m-, and p-thiocresol, 2-mercaptoethylamine, ethylcyclohexanedithiol, p-menthane-2,9-dithiol, 1,2-ethanedithiol, cysteine, cystein hydrochloride, cysteine ethylester. Preferred functionalized end-capping agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

Non-functionalized end-capping agents are those that contain a group capable of terminating a radical chain reaction (e.g., a thiol) but no further functional groups. Such end-capping agents are particularly useful when a functional group is incorporated through the fluorochemical or non-fluorinated monomer) or through the group X in a compound of Formulas III or IV) as described below. Such compounds include mono, di, and polythiols such as ethanethiol, propanethiol, butanethiol, hexanethiol, n-octylthiol, t-dodecylthiol, 2-mercaptoethyl ether, 2-mercaptoimidazole, and the like.

Whether functionalized or not, an end-capping agent is present in an amount sufficient to control the number of polymerized monomer units in the oligomer. The end-capping agent is generally used in an amount of about 0.05 to about 0.5 equivalents, preferably about 0.25 equivalents, per equivalent of olefinic monomer.

Also present in step (1) is a free-radical initiator as defined above in connection with X. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as t-butyl perbenzoate and di-t-butylperoxy phthalate, diacylperoxides such as benzoyl peroxide and lauroyl peroxide.

The initiating radical formed by an initiator can be incorporated into the fluorochemical oligomer to varying degrees depending on the type and amount of initiator used. Therefore, a compound of the invention can be functionalized by way of Scheme II through the use of a functionalized initiator. Step (1) of Scheme II can therefore be carried out in the absence of the above-described thiol end-capping agents. Examples of suitable functionalized initiators include those described above in connection with functionalized groups X. Some such initiators are available from Wako Pure Chemical Industries (Osaka, Japan) as VA-548 (phenol-functional), VA-500 (aniline-functional), VR-558 (alkanol-functional), VR-041 (alkylamino-functional), V-601 (ester-functional), and V-501 (acid-functional).

When a compound is to be functionalized via the initiator, it is preferred to use the initiator in an amount such that the molar ratio of initiator to olefinic monomers is between about 0.01 to about 0.5, more preferably between about 0.05 to about 0.25. Otherwise, a suitable amount of initiator depends on the particular initiator and other reactants being used. About 0.1 percent to about 5 percent, preferably about 0.1 percent, to about 0.8 percent, and most preferably about 0.2 percent by weight of an initiator can be used, based on the total weight of all other reactants in the reaction.

Step (1) of either Scheme can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON TM 113, trichloroethylene, $\alpha,\alpha,\alpha$-trifluorotoluene, and the like, and mixtures thereof.

Likewise, step (1) of either Scheme can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The product of step (1), a compound of Formula VII (Scheme I) or VIII (Scheme II), can be elaborated via conventional methods to include further or different functional groups, the product still being within the ambit of the respective formula. For example, a hydroxy-functional compound can be reacted with an epichlorohydrin to provide a further compound with both hydroxy and chloro groups. As a further example, a hydroxy-functional compound can be oxidized by methods known to those skilled in the art to provide an acid-functional compound, or reacted with caprolactam to provide an amine-functional compound also containing an ester group.

In step (2) a compound of Formula VII (Scheme I) or VIII (Scheme II) is reacted to form the linking group Z. Step (2) diverges to afford one of two general classes of compounds. One class, represented by compounds of Formulas I and III, is the result of two or more fluorochemical oligomers each independently reacting with a single di- or polyfunctional amino resin. The other class, represented by compounds of Formula II, is the result of two or more amino resin molecules each independently reacting with a nucleophilic functional group of a single di- or polyfunctional fluorochemical oligomer Step (2) is preferably carried out under dry conditions either neat or in a polar solvent that has a boiling point higher than that of the by-product formed by the displacement of hydroxyl or alkoxy from an amino resin, (i.e., water or an alcohol). Butyl acetate, methyl isobutyl ketone, trifluorotoluene and the like are suitable. Suitable reaction temperatures will be easily determined by those skilled in the art based on the particular reagents and solvents being used and the particular by-products formed in the reaction. While it is not practical to enumerate particular temperatures suitable for all situations, generally suitable temperatures are between about 80° C. and about 200° C. Reduced pressure can also be used to remove by-products.

Catalysts can be used in step (2). For example, under suitable conditions acidic catalysts such as p-toluenesulfonic acid, sulfuric acid, or the like can be used, and certain organotitanates are useful.

Suitable compounds for use in step (2) include methylolated melamines, benzoguanamines, and acetylguanamines; methylolated ureas such as dimethylolurea, dimethylolethyleneurea, and dimethylolpropyleneurea; dimethylol derivatives of tetrahydro-5-alkyl-S-triazones; glyoxal resins such as dimethyloldihydroxyethylene urea (DMDHEU) and tetramethylolglycoluril; methylated derivatives of any of the foregoing; and uron resins such as N,N'-bis(methoxymethyl)uron.

Moiety R can contain other types of groups. Such can be introduced by, for example, reacting a compound of Formulas I, II, or III with a reagent containing a moiety that can impart soft hand, stain release, or improved water repellency, and a group reactive to an amino resin. Examples of reagents suitable for use in step (3) include acids such as lauric acid, palmitic acid, stearic acid, oleic acid, sorbic acid, linoleic acid, fluorochemical alcohols, amines, and thiols such as those disclosed, for example, in U.S. Pat. Nos. 2,666,797 (Husted), 2,691,043 (Husted), 3,398,182 (Guenther et al.), and 4,606,737 (Stern) the disclosures of which are incorporated herein by reference; ether-containing alcohols, diols, and polyols such as monoglyme, monodiglyme, monotetraglyme, methoxyethylene glycols and polyethyleneglycols (such as those available as CARBOWAX TM ); block copolymer alcohols, diols derived from ethylene oxide and propylene oxide (such as those available as PLURONIC TM ); random copolymers of ethylene oxide and propylene oxide, tetramethylene oxide diols (such as those available as TERATHANE ™); polyether-containing mono-, di-, and polyamines (such as those available as JEFFAMINE ™); mono, di, or polyfunctional siloxanes such as Dow Corning Q4-3667 (diol), Dow Corning X-2-8024 (dimercaptan), Dow Corning 1248 (polyol), Dow Corning Q4-3557 (polyol), Dow Corning 8026 (polyol), Dow Corning 531 and 536 (polyamines); poly(epichlorohydrin) mono-, di-, or triols (such as those available as PECH ™, 3M); mono, di, or polyalcohols such as 2-ethylhexanol, stearylalcohol, 1,6-hexanediol, and 1,10-decanediol; and mono, di- or polythiols such as octylthiol, dodecathiol, ethandithiol, and the like.

When a composition of the invention is applied as a treatment to a fibrous substrate, e.g., a fabric intended for use in a garment, it is preferred that a treated substrate comprise about 0.1% to about 1% by weight of a fluorinated compound of the invention, based on the weight of the untreated substrate.

Knowing the amount of compound intended to be incorporated on the substrate, the percent pick-up of the substrate, and the mass of the substrate, a composition of the invention can be applied to a substrate by any suitable method. For example, a composition can be prepared in the form of an aqueous dispersion and the substrate treated therewith. A dispersion will generally contain water, a fluorinated compound of the invention in an amount effective to provide repellent properties to a substrate treated therewith, and an emulsifier in an amount effective to stabilize the dispersion. Water is preferably present in an amount of about 70 to about 900 parts by weight based on 100 parts by weight of the fluorinated compound of the invention. The emulsifier is preferably present in an amount of about 1 to about 25 parts by weight, preferably about 5 to about 10 parts by weight, based on 100 parts by weight of the fluorinated compound of the invention. Conventional cationic, nonionic, anionic, and zwitterionic emulsifiers are suitable.

In order to effect treatment of a substrate, the substrate can be immersed in the dispersion and agitated until it is saturated. The saturated substrate can then be run through a padder/roller to remove excess dispersion, dried in an oven at a relatively low temperature (e.g., 70° C.) for a time sufficient to remove the dispersion medium (e.g. water, ethylene glycol, or a mixture thereof), and cured at a temperature and for a time sufficient to provide a cured treated substrate. This curing process can be carried out at temperatures between 40° C. and about 200° C. depending on the particular composition used. In general, a temperature of about 150° C. for a period of about 10 minutes is suitable. The cured treated substrate can be cooled to room temperature and used as desired, e.g., incorporated or fashioned into a garment such as rainwear.

In order to improve the fixing of a fluorinated compound of the invention to a substrate, it is sometimes advantageous to include in the dispersion certain additives, polymers, thermo-condensable products and catalysts capable of promoting interaction with the substrate. Among these are the condensates or precondensates of urea or of melamine and formaldehyde (referred to herein as amino resins).

If it is desired to increase the hydrophobic character of a substrate to be treated with a composition of the invention, it is possible to use in combination with the composition of the invention certain fluorine-free extenders such as paraffin; compositions containing alkylketenes or derivatives thereof; siloxanes; chlorohydrates of stearamido-methylpyridinium; condensates of fatty acids with melamine or urea derivatives (such as the product obtained on reacting stearic acid with hexamethoxymethylmelamine); condensates of fatty acids with polyamines (such as the reaction product of stearic acid with diethylenetriamine) and their epichlorohydrin adducts; polymers and copolymers of acrylates, methacrylates, maleic anhydride, olefins, or halogenated olefins; isocyanate derivates such as oxime-blocked urethanes and isocyanurates; and the like. It is also possible to use salts of inorganic or organic acids such as aluminum stearate, zirconium acetate, zirconium oxychloride or Werner complexes such as chromium stearatochloride.

If it is desired to improve the softness or "hand" of a substrate treated with a composition of the invention, it is possible to use fluorine-free softeners, such as certain polyethylenes, polydimethylsiloxanes, modified hydrogenalkylpolysiloxanes, or other materials known to those skilled in the art.

It is also possible to use a composition of the invention in combination with other fluorinated products or with polymers or auxiliary products such as polyglycols, colloids such as starch, dextrin, casein, sizing agents, fixing or retaining agents, materials to improve stain resistance, cleaning ability, fire proofing or antistatic properties, buffering agents, fungicidal agents, optical bleaching agents, sequestering agents, mineral salts, surface-active agents, or swelling agents to promote penetration. Particular suitable auxiliary products and amounts thereof can be easily selected by those skilled in the art.

Besides application in oilproofing and waterproofing substrates, and in providing anti-adhesion properties, the compositions of the invention can also be used to protect substrates against solvents or certain aggressive chemicals. They can be used on textiles, paper, or leather in order to impart properties such as stain resistance, soil resistance, soil release, and stain release. They can also be used for obtaining particular properties such as antistatic, antipiling, mold release, corrosion inhibition or anti-fouling properties.

Substrates treated with compositions of the invention were tested by the test methods set forth below.

Water Spray Test (SR)

The resistance of a treated substrate to wetting with water was measured using AATCC Test Method 22-1977, "Water Repellency: Spray Test" as described in *American Association of Textile Chemists and Colorists Technical Manual*, 1977, 53, 245. Samples are rated on a scale of 0 to 100, with 0 indicating complete wetting of the upper and lower surfaces of the substrate and with 100 indicating no wetting.

Oil Repellency Test (OR)

The oil repellency of a substrate treated with a compound of the invention was measured using AATCC Test Method 118-1975, "Oil Repellency: Hydrocarbon Resistance Test" as described in *AATCC Technical Manual*, 1977, 53, 223. This test measures the resistance of a substrate to wetting by a series of hydrocarbon liquids with a range of surface tensions. The values reported range from 0 (least repellent) to 8 (most repellent).

Laundering Procedure

The procedure set forth below was used to prepare treated substrate samples designated in the examples below as "5X Laundered".

A 230 g sample of generally square, 400 cm² to about 900 cm² sheets of treated substrate was placed in a washing machine along with a ballast sample (1.9 Kg of 8 oz fabric in the form of generally square, hemmed 8100 cm² sheets) Conventional detergent ("TIDE", 46 g) is added and the washer is filled to high water level with hot water (49° C.±3° C.). The substrate and ballast load is washed five times using a 12-minute normal wash cycle and the substrate and the ballast are dried together in a conventional clothes dryer set on the "heat" setting for about 45 minutes. The dry substrate is pressed using a hand iron set at the temperature recommended for the particular substrate fabric.

Dry Cleaning Procedure

Substrate samples designated in the examples below as "Dry Cleaned" were treated as set forth in AATCC Test Method 7-1975, note 8.1.

Stain Release

A sample of a treated substrate (20 cm×70 cm minimum size, 30 cm×30 cm maximum size) is placed on a blotter. Five drops of each of the indicated staining oils, KAYDOL ™ (Witco Chemical Co.) and 3M Stain E (3M), are placed on separate portions of the substrate. The resulting puddles of oil are each covered with a piece of glassine film, and a 2.27 kg (5 lb.) weight is placed over each piece of film directly over the oil and allowed to stand for 60 seconds. The weights and films are removed, and the substrate is hung for 15-60 minutes.

A dummy load of untreated substrate (1.4 kg, 3 pounds) is placed in a conventional washing machine. Detergent ("TIDE", 100g) is added, and the washer is filled to high water level with water at 120°±5° C. The washer is started with a 12 minute normal wash cycle, and the treated stained substrate samples are added in order to bring the total weight of the load to 1.8±0.2 kg. After the spin cycle, the treated stained samples are separated and dried in a conventional clothes dryer for about 20 minutes at about 70° C. Within 4 hours of drying, the samples are rated according to the 3M Stain Release Rating Scale.

The following describes the preparation of intermediates that are used to prepare compounds of the invention in the examples that follow. All reactions are carried out under a nitrogen atmosphere unless otherwise indicated. All parts and percentages are by weight unless otherwise indicated.

Intermediates I1-I5

Into a dry 500 ml three-necked flask fitted with a condenser, a stirrer, a thermometer and nitrogen gas inlet and outlet, was placed 3.9 g (0.05 mol) 2-mercaptoethanol as an end-capping agent, 122 g (0.2 mol) N-methylperfluorooctanesulfonamidoethyl acrylate (MeFOSEA) as fluorochemical monomer, 0.91 g azoisobutyronitrile (AIBN) as an initiator, and 294 g ethyl acetate. The resulting reaction mixture was heated to 40° C. and deaerated three times using a vacuum aspirator and nitrogen pressure. The deaerated solution was heated at reflux (about 80° C.) for 15 hrs. A clear, slightly yellow solution was obtained. Analysis of the reaction mixture by gas chromatography indicated that substantially no starting materials remained. The reaction mixture was poured into 2000 mL of heptane. A white precipitate formed and was filtered, washed with 200 mL water, 200 mL heptane, and dried in vacuo at room temperature to provide Intermediate I1 as a white powder.

Using the general procedure employed to make Intermediate I1, further intermediates were prepared using the fluorochemical monomers, end-capping agents, and molar ratios set forth in Table I, wherein MeFOSEA represents N-methylperfluorooctanesulfonamido ethyl acrylate and MeFOSEMA represents N-methylperfluorooctanesulfonamidoethyl methacrylate.

TABLE I

| Intermediates | Fluorochemical Monomer | End-capping Agent | Molar Ratio |
|---|---|---|---|
| I1 | MeFOSEA | HSCH$_2$CH$_2$OH | 4/1 |
| I2 | MeFOSEA | HSCH$_2$CH$_2$OH | 8/1 |
| I3 | MeFOSEA | HSCH$_2$CH$_2$OH | 20/1 |
| I4 | MeFOSEMA | HSCH$_2$CH$_2$OH | 4/1 |
| I5 | MeFOSEA | HSCH$_2$COOH | 4/1 |

Intermediates I6-I9

Using the general procedure described for Intermediate I1, further intermediates were prepared by co-oligomerization of fluorochemical monomers and fluorine-free monomers. The reactants used and relative amounts thereof are shown in Table II below, wherein MeFOSEA is as defined above; isoBMA represents isobutyl methacrylate; Hoe T 3605 represents a telomer acrylate $C_nF_{2n+1}CH_2CH_2(O)CCH=CH_2$ (n ranging from 6 to 14) available from Hoechst, Germany); CW 750A represents the acrylate formed by esterification of CARBOWAX ™ 750 methoxypolyethyleneglycol monoalcohol (available from Union Carbide) with acrylic acid as described in U.S. Pat. No. 4,624,889 (Bries), (the disclosure of which is incorporated herein by reference), and PDMS methacrylate represents a polydimethylsiloxane methacrylate of the formula $$(CH_3)_3SiO[Si(CH_3)_2O]_n[Si(CH_3)_2CH_2CH_2CH_2OC(O)C=CH_2]$$

with a molecular weight of about 10,000, described in U.S. Pat. No. 4,728,571 (Clemens et al), the disclosure of which is incorporated herein by reference.

TABLE II

| Intermediate | Components | Molar Ratios |
|---|---|---|
| I6 | MeFOSEA/isoBMA/HSCH$_2$CH$_2$OH | 3.2/0.8/1 |
| I7 | Hoe 3605/isoBMA/HSCH$_2$CH$_2$OH | 3.2/0.8/1 |
| I8 | MeFOSEA/PDMS methacrylate/ HSCH$_2$CH$_2$OH | 4/X$^a$/1 |
| I9 | MeFOSEA/CW 750A/HSCH$_2$CH$_2$OH | 4/8/1 |

$^a$The silicone monomer was used in an amount corresponding to 25% by weight based on the weight of the fluorochemical monomer.

Objects and advantages of this invention are further illustrated by the following examples. The particular materials and amounts thereof recited in these examples, as well as other conditions and details, should not be construed to unduly limit this invention.

EXAMPLES

Examples 1-10

Into a 500 ml three-necked flask fitted with a reflux condenser, a Dean Stark trap, a thermometer, and a stirrer, was placed 126 g (about 0.05 mol) of Intermediate I1, 19.5 g (about 0.05 mol) hexamethoxymethylmelamine (Chemische Fabrik Pfersee, Germany) and 0.21 g (about 0.15% by total weight of reagents) of p-toluenesulfonic acid. The reaction mixture was heated to 80°-90° C., and methanol was removed via the Dean Stark trap. The temperature was raised to 160° C. over a 5 hr period. The reaction mixture was then heated at 160° C. for 3 hours. A brown, viscous reaction mixture was formed. The material was cooled to room temperature, then 115 g of the product was dissolved in 172 g hexafluoroxylene (about 40% solids solution) at 75° C.

In a separate beaker was prepared an aqueous surfactant solution containing 11.5 g MARLOWET ™ 5401 surfactant (Huls, Germany), 69 g of ethylcellulose, and 460 g deionized water. This solution was heated to about 75° C. Under vigorous stirring, the solution containing the reaction product was added to the aqueous surfactant solution to afford a pre-emulsion. This pre-emulsion was then emulsified at a temperature of about 75° C. by passing through a preheated Manton-Gaulin homogenizer 5 times at a pressure of 28,000 kPA. The resulting emulsion was filtered through cheesecloth and the hexafluoroxylene was removed at 45°-50° C. under reduced pressure. A slightly brown, nearly transparent dispersion resulted, which was filtered again through cheesecloth and stored.

Using the general synthetic and emulsification procedure set forth above further compositions of the invention were made using reactants listed in Table III below, wherein HMMM represents hexamethoxymethylmelamine and DMDHEU represents dimethyloldihydroxyethyleneurea

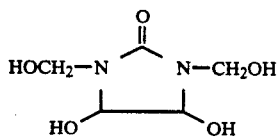

TABLE III

| Example | Intermediate (A) | Amino resin (B) | Other Reagents (C) | Molar Ratio A/B/C |
|---|---|---|---|---|
| 1 | I1 | HMMM | — | 1/1 |
| 2 | I1 | DMDHEU | — | 1/1 |
| 3 | I2 | HMMM | — | 1/1 |
| 4 | I3 | HMMM | — | 1/1 |
| 5 | I4 | HMMM | — | 1/1 |
| 6 | I5 | HMMM | — | 1/1 |
| 7 | I6 | HMMM | — | 1/1 |
| 8 | I7 | HMMM | — | 1/1 |
| 9 | I8 | HMMM | — | 1/1 |
| 10 | I9 | HMMM | octadecylalcohol | 1/1/1 |

X = —H or —C(CH$_3$)$_2$—CN
R$_1$ = R$_2$ = H
Q = SO$_2$N(CH$_3$)CH$_2$CH$_2$O(O)C—
R$_f$ = C$_8$F$_{17}$
a = 4
b = 0
m = 1

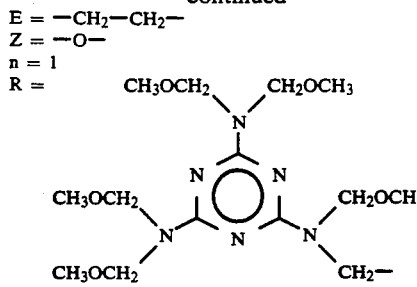

E = —CH$_2$—CH$_2$—
Z = —O—
n = 1
R = (shown in image above)

The compositions of Comparative Examples 1-3 were prepared as follows:

Comparative Example 1. Comparat

A compound was prepared using the procedure described in U.S. Pat. No. 4,302,366 (Perronin et al), Example 2, using MeFOSEA as fluorochemical monomer. A dispersion was prepared using the emulsification method of Example 1 above.

Comparative Example 2

A compound was prepared using the procedure described in Japanese Patent No. 55-7820 (Hayashi et al.), Example 2, using MeFOSEA as fluorochemical monomer, 2-mercaptoethanol as end-capping agent (molar ratio 4:1), ethyl acetate as solvent and AIBN as initiator. A dispersion was prepared as described in Example 1 above, but without the ethylcellulose in the aqueous solution.

Comparative Example 3

A compound was prepared according to the procedure of Example 1 above using HMMM and N-methylperfluorooctanesulfonamido-ethanol in a molar ratio of 1:4. A dispersion was prepared as described in Example 1 above.

The compositions prepared in Examples 1-10 and Comparative Examples 1-3 above were used to treat 50/50 polyester/cotton blend fabrics. No resins were used. Treatment level was 0.3% by weight based on the weight of the fabric. The substrates were cured and dried at 150° C. for 10 min. The results are shown in Table IV below.

TABLE IV

| | Initial | | 5 Launderings | | 1 Dryclean | |
|---|---|---|---|---|---|---|
| Example | OR | SR | OR | SR | OR | SR |
| 1 | 6 | 100 | 4 | 70 | 6 | 80 |
| 2 | 5 | 100 | 4 | 70 | 5 | 70 |
| 3 | 6 | 100 | 3 | 70 | 5 | 70 |
| 4 | 5 | 100 | 4 | 60 | 4 | 70 |
| 5 | 6 | 100 | 3 | 80 | 5 | 80 |
| 6 | 5 | 100 | 3 | 60 | 4 | 60 |
| 7 | 6 | 100 | 4 | 80 | 6 | 80 |
| 8 | 6 | 100 | 4 | 80 | 5 | 80 |
| 9 | 5 | 100 | 4 | 70 | 4 | 60 |
| 10 | 5 | 100 | 4 | 70 | 4 | 70 |
| Comparative Example 1 | 5 | 50 | 0 | 0 | 3 | 50 |
| Comparative Example 2 | 6 | 50 | 2 | 0 | 4 | 50 |
| Comparative Example 3 | 3 | 100 | 2 | 80 | 2 | 80 |

Table IV shows that compositions of the invention provide good oil and water repellency, even after laundering or drycleaning. The results are generally better than those obtained with the comparative examples.

The comparison of the results obtained with the compositions of the invention to those obtained with Comparative Example 3, which contains isolated fluoroaliphatic groups and not several fluoroaliphatic groups proximal to one another, shows that the latter structural organization of the fluoroaliphatic groups affords superior oil repellency in these compositions of the invention.

The compositions of Examples 1, 3, and 4 have oligomeric chains containing about 4, 8, and 20 polymerized fluorochemical monomers respectively (based on the molar ratio of the monomer to the chain transfer agent used in their preparation). The results indicate that oligomeric species containing between 4 to 8 polymerized monomers are preferred materials.

The composition of Example 7 was prepared using an oligomer containing a 4:1 ratio of fluorochemical to fluorine-free monomer (i.e. a "mixed" oligomer). Comparing the results of Example 1, where an oligomeric intermediate was used containing fluorochemical monomers only, shows that the material of Example 7 containing the "mixed" oligomeric intermediate, and therefore a lower fluorine content, is at least as good in overall performance (indicating an improvement in fluorine efficiency).

The composition of Example 9, comprising a siloxanyl moiety, provided a particularly soft hand to the fabric, especially when compared to the other examples or comparative examples.

The composition of Example 6, where the fluorochemical oligomeric intermediate is linked to the melamine derivative by —$CO_2$— instead of —O—, shows good repellent properties.

Compositions of Examples 1 and 7 were also used to treat a 100% cotton fabric. The treatment bath contained: (1) the appropriate aqueous dispersion; (2) a resin formulation consisting of LYOFIX CHN ™ resin (Chemische Fabrik Pfersee, 12 g per liter based on total volume of the treatment bath), Knittex ZO ™ resin (Chemische Fabrik Pfersee, 6 g per liter based on total volume of the treatment bath), and 60 percent acetic acid (2 mL per liter based on total volume of the treatment bath); and (3) water. The treatments were made by a padding application at 0.3% solids on fabric. After treatment, the substrates were dried and cured at 150° C. for 10 min. The results are shown in Table V.

TABLE V

| Example | Initial | | 5 Launderings | | 1 Dryclean | |
|---|---|---|---|---|---|---|
| | OR | SR | OR | SR | OR | SR |
| 1 | 6 | 100 | 3 | 60 | 5 | 70 |
| 7 | 6 | 100 | 2 | 70 | 5 | 70 |

The results indicate that these compositions of the invention give good repellent properties on cotton, a fabric known to be difficult to treat effectively.

Examples 11 and 12

Compositions were prepared using the synthetic and emulsification procedures of Example 1, using components set forth in Table VI below, wherein CW 750 and CW 2000 represent CARBOWAX ™ methoxypolyethyleneoxide monoalcohols of average molecular weight 750 and 2000 respectively (Union Carbide).

TABLE VI

| Example | Intermediate (A) | Amino resin (B) | Co-Reagents (C) | Molar Ratio A/B/$C_1$/$C_2$ |
|---|---|---|---|---|
| 11 | I1 | HMMM | CW 2000 CW 750 | 1/1/1/2 |
| 12 | I6 | HMMM | CW 2000 | 1/1/2/— |

The composition of Comparative Example 4 was prepared as follows:

A compound was prepared using the procedure described in U.S. Pat. No. 3,728,151 (Sherman et al.), Example 24. A dispersion was prepared using the emulsification procedure of Example 1 above.

A 50/50 polyester/cotton blend fabric was treated at a level of 0.40% solids on fabric. No resins were used. The treated fabric was dried and cured at 150° C. for 5 min. The fabrics were tested using test procedures set forth above. Results are shown in Table VII.

TABLE VII

| Example | Initial | | | 5 Launderings | | | 1 Dryclean | | |
|---|---|---|---|---|---|---|---|---|---|
| | OR | Kaydol | Stain E | OR | Kaydol | Stain E | OR | Kaydol | Stain E |
| 11 | 5 | 7 | 8 | 3 | 7 | 7 | 3 | 6 | 7 |
| 12 | 5 | 7 | 7 | 2 | 6 | 7 | 3 | 6 | 7 |
| Comparative Example 4 | 2 | 6 | 6 | 0 | 5 | 5 | 1 | 5 | 6 |

Table VII shows that compositions of the invention provide good oil repellency and stain-release properties, even after laundering and drycleaning.

Various modifications and alterations of this invention will become apparent to those skilled in the art without departing from the scope and spirit of this invention. It should be understood that this invention is not to be unduly limited to the embodiments set forth herein.

What is claimed is:

1. A fluorochemical composition comprising one or more fluorinated compounds, each of the latter comprising:

a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group, wherein the oligomeric portion is bonded through a linking group selected from the group consisting of —O—, —S—, —NH—, and —$CO_2$—, to a moiety comprising a group derived from an amino resin.

2. A composition according to claim 1, wherein the fluorinated compound is of the formula

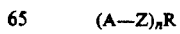

wherein A is a fluorochemical oligomeric portion of the formula

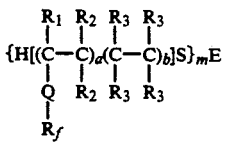

and wherein
- n is a whole number;
- m is an integer from 1 to about 5;
- a and b are integers such that A is oligomeric and comprises a plurality of $R_f$ groups;
- $R_1$ is hydrogen, halogen, or straight chain or branched chain alkyl containing 1 to about 4 carbon atoms;
- each $R_2$ is independently hydrogen or straight chain or branched chain alkyl containing 1 to about 4 carbon atoms;
- Q is an organic linking group;
- $R_f$ is a fluoroaliphatic group comprising a fully fluorinated terminal group;
- each $R_3$ is independently hydrogen, halogen, or an organic group;
- E is an organic group;
- each Z is independently a linking group selected from the group consisting of —O—, —S—, —$CO_2$—, and —NH—;
- R comprises a group derived from an amino resin; and wherein one of the $R_1$, $R_2$, $R_3$, Q, and E groups has an unsatisfied valence through which the group is bonded to Z.

3. A composition according to claim 1, wherein the fluorinated compound is of the formula

wherein A is a fluorochemical oligomeric portion of the formula

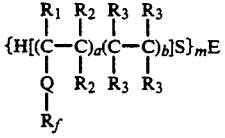

and wherein
- n is a whole number;
- m is an integer from 1 to about 5;
- a and b are integers such that A is oligomeric and comprises a plurality of $R_f$ groups;
- $R_1$ is hydrogen, halogen, or straight chain or branched chain alkyl containing 1 to about 4 carbon atoms;
- each $R_2$ is independently hydrogen or straight chain or branched chain alkyl containing 1 to about 4 carbon atoms;
- Q is an organic linking group;
- $R_f$ is a fluoroaliphatic group comprising a fully fluorinated terminal group;
- each $R_3$ is independently hydrogen, halogen, or an organic group;
- E is an organic group;
- each Z is independently a linking group selected from the group consisting of —O—, —S—, —$CO_2$—, and —NH—;
- R comprises a group derived from an amino resin; and wherein at least one of the $R_1$, $R_2$, $R_3$, Q, and E groups has at least one unsatisfied valence through which each such group is bonded to a separate group Z, the total number of unsatisfied valences or bonds being equal to the value of the integer n.

4. A composition according to claim 3 wherein said organic linking group Q is selected from the group consisting of a straight chain alkylene branched chain alkylene, cyclic alkylene, arylene, aralkylene, oxy, thio, sulfonyl, sulfoxy, amino, imino, sulfonamido, carboxyamido, carbonyloxy, urethanylene, ureylene, and combinations thereof, and organic group E is selected from the group consisting of a straight chain alkylene, branched chain alkylene, cyclic alkylene, arylene, aralkylene, oxy, thio, sulfonyl, sulfoxy, imino, sulfonamido, acylimino, acyloxy, urethanylene, ureylene, and combinations thereof.

5. A composition according to claim 1, wherein the fluorinated compound is of the formula

wherein B is a fluorochemical oligomeric portion of the formula

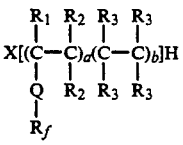

and wherein
- X is a group derived from a free radical initiator;
- n is a whole number;
- a and b are integers such that B is oligomeric and comprises a plurality of $R_f$ groups;
- $R_1$ is hydrogen, halogen, or straight chain or branched chain alkyl containing 1 to about 4 carbon atoms;
- each $R_2$ is independently hydrogen or straight chain or branched chain alkyl containing 1 to about 4 carbon atoms;
- Q is an organic linking group;
- $R_f$ is a fluoroaliphatic group comprising a fully fluorinated terminal group;
- each $R_3$ is independently hydrogen, halogen, or an organic group;
- each Z is independently a linking group selected from the group consisting of —O—, —S—, —$CO_2$—, and —NH—;
- R comprises a group derived from an amino resin; and wherein one of the $R_1$, $R_2$, $R_3$, Q, and X groups has an unsatisfied valence through which the group is bonded to Z.

6. A composition according to claim 5 wherein said organic linking group Q is a straight chain alkylene, branched chain alkylene, cyclic alkylene, arylene, aralkylene, oxy thio, sulfonyl, sulfoxy, amino, imino, sulfonamido, carboxamido, carbonyloxy, urethanylene, ureylene, or combinations thereof, and X is selected from the group consisting of t-butoxy, benzoyloxy, and —$C(CH_3)(CH)CH_2CH_2CO_2H$ and —$C(CH_3)_2CN$.

7. A composition according to claim 1, wherein the amino resin is a methylolated melamine, a benzoguanamine, an acetylguanamine, a methylolated urea, a dimethylol derivative of tetrahydro-5-alkyl-S-triazone; a glyoxal resin, a methylated derivative of any of the foregoing, a uron resin, methylolacrylamide, or methylolmethacrylamide.

8. A composition according to claim 1, wherein the fluorinated compound further comprises a functional group that imparts soft hand, stain release, or water repellency when the compound is applied to a fibrous substrate.

9. A composition according to claim 8, wherein the fluorinated compound comprises a functional group that imparts a soft hand when the compound is applied to a fibrous substrate.

10. A composition according to claim 9, wherein the functional group is a siloxanyl group.

11. A composition according to claim 8, wherein the fluorinated compound comprises a functional group that imparts stain release when the compound is applied to a fibrous substrate.

12. A composition according to claim 11, wherein the functional group is a polyoxyalkylenyl group.

13. A composition according to claim 1, wherein the aliphatic backbone of the fluorochemical oligomeric portion consists essentially of polymerized units derived from a fluorochemical monomer.

14. A composition according to claim 1, wherein the fluorochemical oligomeric portion contains from 2 to about 8 polymerized units derived from a fluorochemical monomer.

15. A composition according to claim 1, wherein the fluorochemical oligomeric portion contains from 2 to about 4 polymerized units derived from a fluorochemical monomer.

16. A composition according to claim 1, wherein the fluorochemical oligomeric portion contains from 2 to about 8 polymerized units derived from a combination of fluorochemical and non-fluorinated monomers, and wherein the ratio of the number of polymerized units derived from the fluorochemical monomer to the number of polymerized units derived from the non-fluorinated monomer is about 4:1.

17. A composition according to claim 16, wherein the fluorochemical oligomeric portion contains from 2 to about 4 polymerized units.

18. A composition according to claim 1 wherein said organic linking group has 1 to 20 carbon atoms and is selected from the group consisting of a straight chain alkylene, branched chain alkylene, cyclic alkylene, arylene, aralkylene, oxy thio, sulfonyl, sulfoxy, amino, imino, sulfonamido, carboxamido, carbonyloxy, urethanylene, ureylene, and combinations thereof.

19. A composition according to claim 18 wherein said organic linking group Q is selected from the group consisting of a straight chain alkylene branched chain alkylene, cyclic alkylene, arylene, aralkylene, oxy, thio, sulfonyl, sulfoxy, amino, imino, sulfonamido, carboxyamido, carbonyloxy, urethanylene, ureylene, and combinations thereof, and organic group E is selected from the group consisting of a straight chain alkylene, branched chain alkylene, cyclic alkylene, arylene, aralkylene, oxy, thio, sulfonyl, sulfoxy, imino, sulfonamido, acylimino, acyloxy, urethanylene, ureylene, and combinations thereof.

20. A composition according to claim 1, wherein the fluorinated compound comprises from about 5 percent to about 80 percent fluorine by weight based on the total weight of the compound.

21. A composition according to claim 1, wherein the fluorinated compound comprises from about 20 percent to about 80 percent fluorine by weight based on the total weight of the compound.

22. A composition according to claim 1, wherein the fluorinated compound comprises from about 25 percent to about 55 percent fluorine by weight based on the total weight of the compound.

23. A substrate with oil and water repellent properties comprising a fibrous substrate material having on the surface thereof an amount of a composition according to claim 1 effective to impart oil and water repellent properties thereto.

24. A substrate according to claim 23, wherein the fibrous substrate is paper, non-woven, cotton, a polyester-cotton blend, nylon, or leather.

25. A method for imparting oil and water repellent properties to a fibrous substrate material, comprising the steps of:
   (1) applying to the surface of the fibrous substrate material an amount of a composition according to claim 1 effective to impart oil and water repellent properties to the substrate; and
   (2) heating the treated substrate from step (1) at a temperature and for a time sufficient to cure the treated surface.

26. A composition according to claim 1 in the form of an aqueous liquid dispersion, comprising: water; a fluorinated compound according to claim 1 in an amount effective to impart repellent properties to a substrate treated with the dispersion; and an emulsifier in an amount effective to stabilize the dispersion.

27. An aqueous liquid dispersion according to claim 26, further comprising a fluorine-free extender.

28. An aqueous liquid dispersion according to claim 26, further comprising a fluorine-free softener system.

29. A composition according to claim 1 in the form of an aqueous liquid dispersion, comprising: a fluorinated compound according to claim 1 in an amount effective to impart repellent properties to a substrate treated with the dispersion; water in an amount of about 70 to about 900 parts by weight based on 100 parts by weight of the fluorinated compound; and an emulsifier in an amount of about 1 to about 25 parts by weight based on 100 parts by weight of the fluorinated compound.

30. An aqueous liquid dispersion according to claim 20, further comprising a fluorine-free softener system.

31. A compound resulting from a process comprising the steps of
   (a) oligomerizing a fluoroaliphatic-group-containing fluorochemical olefinic monomer and optionally one or more non-fluorinated olefinic monomers in the presence of an end-capping agent that comprises a thiol group and a functional group capable of reacting with an amino resin, in order to provide a functionalized fluorochemical oligomer containing a plurality of fluoroaliphatic groups;
   (b) reacting the functionalized fluorochemical oligomer from step (a) with an an amino resin.

* * * * *